United States Patent [19]

Opheij et al.

[11] Patent Number: 4,835,380

[45] Date of Patent: May 30, 1989

[54] SCANNING DEVICE FOR AN OPTICAL RECORDING AND/OR REPRODUCING APPARATUS

[75] Inventors: Willem G. Opheij; Josephus J. M. Braat, both of Eindhoven, Netherlands

[73] Assignee: U. S. Philips Corporation, New York, N.Y.

[21] Appl. No.: 98,644

[22] Filed: Sep. 21, 1987

[30] Foreign Application Priority Data

Jun. 11, 1987 [NL] Netherlands .......................... 8701359

[51] Int. Cl.$^4$ .......................... G02B 17/00; G11B 7/12
[52] U.S. Cl. .................................... 250/216; 350/444; 350/446; 369/112
[58] Field of Search ........................ 250/216, 234–236; 350/442–444, 446; 369/112

[56] References Cited

U.S. PATENT DOCUMENTS

| | | | |
|---|---|---|---|
| 2,656,761 | 10/1953 | Blaisse | 350/444 |
| 3,825,322 | 7/1974 | Mast | 350/444 |
| 4,554,448 | 11/1985 | Sillitto | 350/442 |
| 4,589,738 | 5/1986 | Ozaki | 350/443 |

Primary Examiner—Edward P. Westin
Attorney, Agent, or Firm—Algy Tamoshunas; Leroy Eason

[57] ABSTRACT

A scanning device for an optical recording and/or reproducing apparatus comprises a mirror objective in the form of a transparent body one surface of which forms an internally reflecting concave reflector and the opposite surface of which forms an internally reflecting convex reflector. A beam of radiation from a radiation source enters a window in the concave reflector, is divergently reflected by the convex reflector back to the concave reflector, and is consequently reflected thereby through a second window in the transparent body so as to form a scanning spot focussed on an information plane to be scanned by the device. The mirror objective includes a phase grating by which radiation reflected from the information surface is separated from the scanning beam and is directed to a radiation-detection system. A very compact write and/or read scanning device is thereby obtained, which may be given a very robust and stable from by fixing the radiation source and the radiation detection system to the surface of the transparent body.

14 Claims, 2 Drawing Sheets

SCANNING DEVICE FOR AN OPTICAL RECORDING AND/OR REPRODUCING APPARATUS

BACKGROUND OF THE INVENTION

1. Field of the Invention

The invention relates to a scanning device for scanning an information plane in an optical record carrier by means of optical radiation, which scanning device comprises a radiation source for supplying a scanning beam and a mirror objective for focussing the scanning beam to a scanning spot on the information plane. The invention also relates to a mirror objective suitable for use in such a scanning device and to an optical recording and/or reproducing apparatus comprising such a scanning device.

2. Description of the Related Art

Scanning an information plane is to be understood to mean both scanning for reading prerecorded information from the information plane and scanning for writing information in the information plane by means of a radiation beam which is intensity-modulated in accordance with the information to be recorded.

A scanning device as described in the opening paragraph, intended for reading an optical record carrier, is known from British Patent Specification No. 1,541,596. This Specification describes an optical scanning device which includes an objective comprising two mirrors whose reflective sides face each other. The one mirror is concave and its reflective side faces the record carrier. The other mirror, which is much smaller, is convex and its reflective side faces the radiation source. The radiation from the radiation source reaches the convex mirror via a passage in the larger concave mirror. The radiation is subsequently reflected towards the concave mirror and focussed by this mirror to a radiation spot in the information plane of the record carrier.

The known objective forms part of a two-stage focussing system in which the entire mirror system is suspended in a magnetic coil with which the position of the objective with respect to the record carrier is controlled. The small mirror is mounted on a piece of piezoelectric material and can be moved up and down with the aid thereof so that a small extent of defocus is periodically produced in the information plane, which is detected by a detection device and from which subsequently a focus-error signal is derived which is used for readjusting the position of the objective by means of the magnetic coil.

By using two separate mirrors in a close working relationship with each other the known scanning device has a rather complicated structure and is sensitive to mechanical perturbations.

SUMMARY OF THE INVENTION

It is an object of the invention to provide a robust scanning device comprising a minimum number of components arranged in close working relationship with one another.

To this end the scanning device according to the invention is characterized in that the mirror objective comprises a transparent body which is bounded by a first surface on a side facing the radiation source and by a second surface on a side remote from the radiation source, facing the information plane. The first surface has a first radiation window therein which is centrally located around the optical axis of the mirror objective and a first reflector reflecting on the inside and which is arranged around the first radiation window. The second surface has a second reflector reflecting on the inside and which is centrally located around the optical axis of the mirror objective, and having a second radiation window located around such reflector. The radiation path of the scanning beam from the radiation source to the record carrier enters the mirror objective via the first radiation window, reverses its direction successively on the second reflector and on the first reflector, and finally leaves the mirror objective through the second radiation window. The two mirrors are coupled with each other very directly by arranging the two facing reflectors on the surfaces of one and the same transparent body. The alignment of the two mirrors with respect to each other can thus be determined during manufacture and will subsequently not be disturbed.

A mirror objective of this type is eminently suitable for use in a movable apparatus for reproducing information recorded on an optical record carrier, for example, a portable or car mounted apparatus. A scanning device according to the invention has the great advantage that the radiation path in the transparent body is folded so that the height of the scanning device can be limited and thus be built into a compact apparatus.

The scanning device according to the invention may be further characterized in that the first reflector is curved aspherically. A well-defined scanning spot can then be obtained without having to resort to arranging corrective optical elements in the radiation path of the scanning beam.

A further embodiment of the scanning device according to the invention is characterized in that the first and second reflectors are curved spherically. This embodiment may be further characterized in that the second radiation window is also curved spherically. Such scanning devices can be manufactured relatively easily because the curved surfaces of the mirror objective are spherical.

The scanning device according to the invention may be further characterized in that the transparent body comprises at least two portions manufactured from materials having different refractive indices. A considerable reduction of spherical aberration can be achieved by suitably providing radiation-refractive faces in the body.

A scanning device according to the invention can be used both for scanning a record carrier having a reflective information surface and a record carrier which is read by transmission of radiation. The scanning device according to the invention is, however, most suitable when using a record carrier having a reflective information surface. The mirror objective can then also be used to receive the radiation reflected from the scanning spot on the information surface and to focus it on a radiation-sensitive detection system.

An embodiment of the scanning device according to the invention, which is suitable for scanning a reflective information plane and in which the scanning device includes a radiation-sensitive detection system, is characterized in that the mirror objective comprises a beam-splitting element for spatially separating the beam emitted by the radiation source and the beam reflected from the information plane. The beam-separating element may be, for example, a splitting-cube or splitting-mirror arranged on the surface of the first radiation window. Such a scanning device used as a read unit is compact and robust because the essential optical elements are integrated in a single component.

The scanning device according to the invention is preferably characterized in that the beam=splitting element comprises a grating As used herein the term grating is to be understood to mean both a conventional grating and a holographic grating or hologram. The grating or hologram may be provided on an existing surface of the transparent body of the mirror objective, or it may be arranged within the volume of the body.

An embodiment of the scanning device according to the invention is characterized in that the grating or hologram is a reflection grating or a reflection hologram which is provided on the second reflector. The grating or hologram is preferably a phase structure.

A further embodiment of the scanning device according to the invention is characterized in that the grating or hologram is a transmission grating or a transmission hologram which is provided on the first radiation window.

A further embodiment of the scanning device according to the invention is characterized in that the transparent body of the mirror objective comprises two interconnected portions and in that the grating or hologram is a transmission grating or a transmission hologram which is provided on one of the two portions on a side facing the other portion.

The use of a grating for coupling out the reflected beam provides the further advantage that focus-error detection and tracking-error detection can also be realized by means of the grating. To this end the scanning device according to the invention may, for example, be characterized in that the grating or hologram comprises at least two sub-gratings having different grating parameters. The sub-gratings differ, for example, in direction and curvature of the grating lines or in their grating period. A beam portion traversing the one grating portion is thereby deflected through a different angle than a beam portion traversing another grating portion. The distance between the radiation spots subsequently formed by the beam portions on the radiation-sensitive detection system is therefore dependent on the distance between the objective system and the information plane. Such a focus-error detection method is in principle described in "Neues aus der Technik", Volume 1980, No.6, page 3.

An embodiment of the scanning device according to the invention in which another focus-error detection method is used is characterized in that the grating or hologram has a constant or linearly varying grating period. Such a grating can introduce astigmatism in the radiation beam reflected from the information pane, which astigmatism can be used for determining the focus-error as described, for example, in U.S. Pat. No. 4,358,200.

The use of a mirror objective with a transparent body in a scanning device may have further advantages relating to the positioning of the radiation source and the radiation-sensitive detection system.

An embodiment of the scanning device according to the invention is therefore characterized in that the radiation source is optically connected to the first radiation window. The radiation source is then, for example, a semiconductor laser, a radiation-emissive surface of which is provided on the radiation window, or the radiation source is connected to the radiation window via an optical fibre or a series of fibres.

Furthermore an embodiment of the scanning device according to the invention, provided with a radiation-sensitive detection system, may be characterized in that the radiation sensitive detection system is arranged on the first radiation window in the radiation path of radiation which has been reflected from the information plane and which has traversed the mirror objective.

The radiation source, the optical fibres or the radiation-sensitive detection system are secured to the first radiation window by means of, for example a transparent adhesive. This results in a single compact and robust integrated component accommodating the entire optical section of the scanning device.

The various embodiments of the scanning device according to the invention may comprise different types of radiation sources such as, for example, a single semiconductor laser, a semiconductor laser train or another radiation source which can be connected to the mirror objective directly or by means of optical fibres.

BRIEF DESCRIPTION OF THE DRAWINGS

The invention will now be described in greater detail by way of example with reference to the accompanying drawings, in which.

DESCRIPTION OF THE PREFERRED EMBODIMENTS

Figure 1:
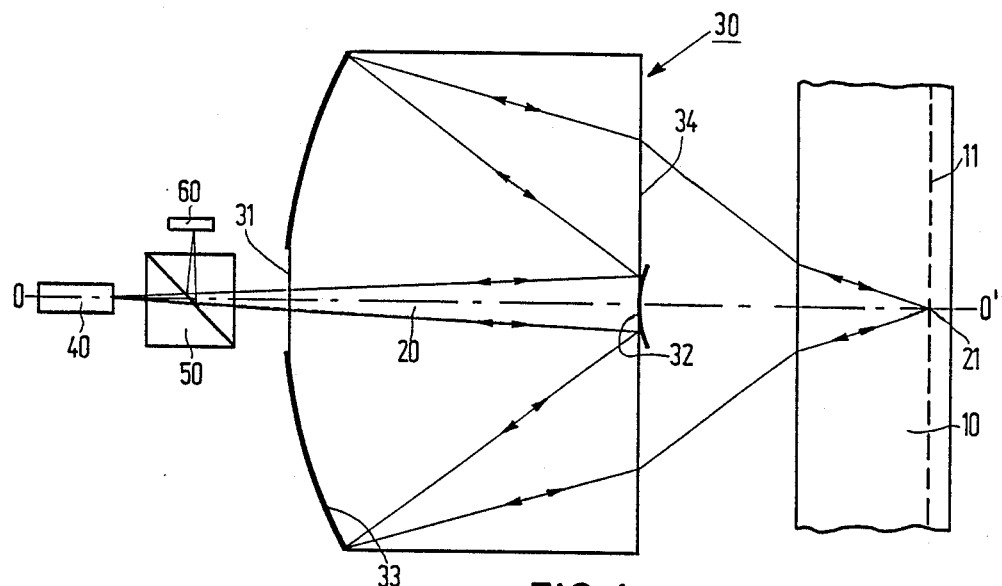
FIG. 1 shows in a diagrammatic cross-section an optical scanning device according to the invention.

FIG. 1 shows a part of an optical record carrier 10 in which an information plane 1 is provided. A scanning device whose principal elements shown are a mirror objective 30 and a radiation source 40 is provided close to the record carrier. The radiation source 40 emits a scanning beam 20 which is focussed to a scanning spot 21 in the information plane 11 by the mirror objective 30. The information plane can be scanned by the scanning spot because the scanning device and the record carrier are movable with respect to each other, for example, because the record carrier can rotate around an axis (not shown) perpendicular to the plane of the record carrier and because the scanning device can move in the radial direction with respect to the same axis.

The scanning beam 20 traverses the mirror objective and the beam enters the transparent body of the objective via the first radiation window 31. Subsequently the scanning beam is reflected from the convex reflector 32 so that the scanning beam widens and is incident on substantially the entire surface of the concave reflector 33. This reflector reflects the scanning beam as a convergent beam which is focussed to a scanning spot 21 in the information plane 11 via the radiation window 34 and a portion of the transparent record carrier 10.

In the case of a reflective information surface with which, for example, the optically readable digital audio discs known under the name of "Compact Disc" are provided, the reflected beam produced by the spot 21 is received by the mirror objective again and traverses the reverse path therein back to the radiation window 31. The reflected beam may enter the radiation source and when using a semiconductor laser as a radiation source it can be detected thereby. This so-called feedback readout is described, for example, in German Patent Specification No. 1,584,664. Preferably, however, a beam-splitting element, for example, a splitting cube 50, separates a portion of the reflected radiation from the scanning beam 20 and projects it on a radiationsensitive detection system 60, splitting cube 50 being arranged in the common radiation path of the emitted and the reflected radiation beams. Since the radiation reflected from the information plane 11 is modulated with the information stored in said information plane when it is scanned by the radiation spot, such information is converted by the system 60 into an electrical signal to be further processed.

Figure 2:
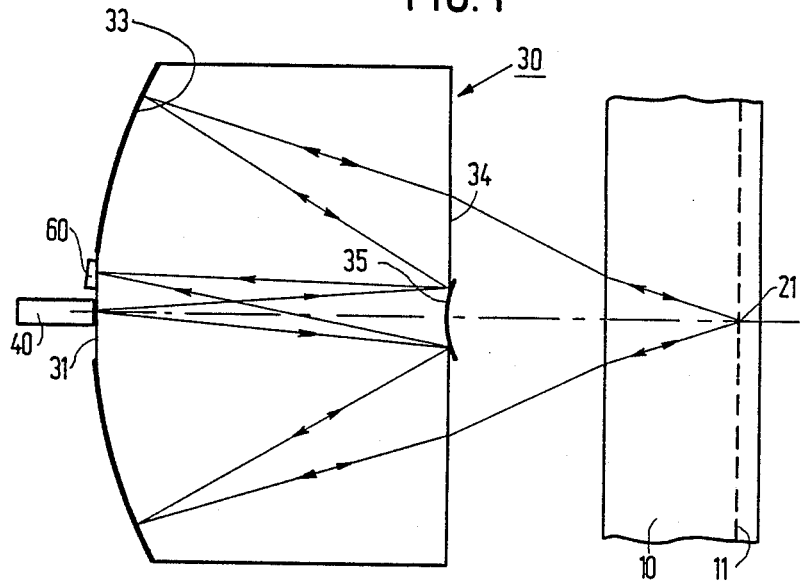
FIGS. 2, 3 and 4 show diagrammatically the scanning device with three different embodiments of the mirror objective.
Figure 3:
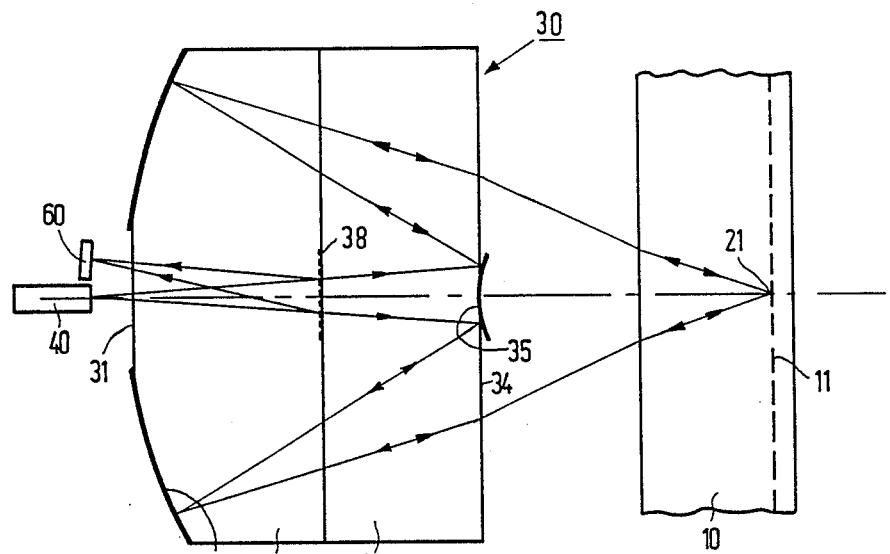
Figure 4:
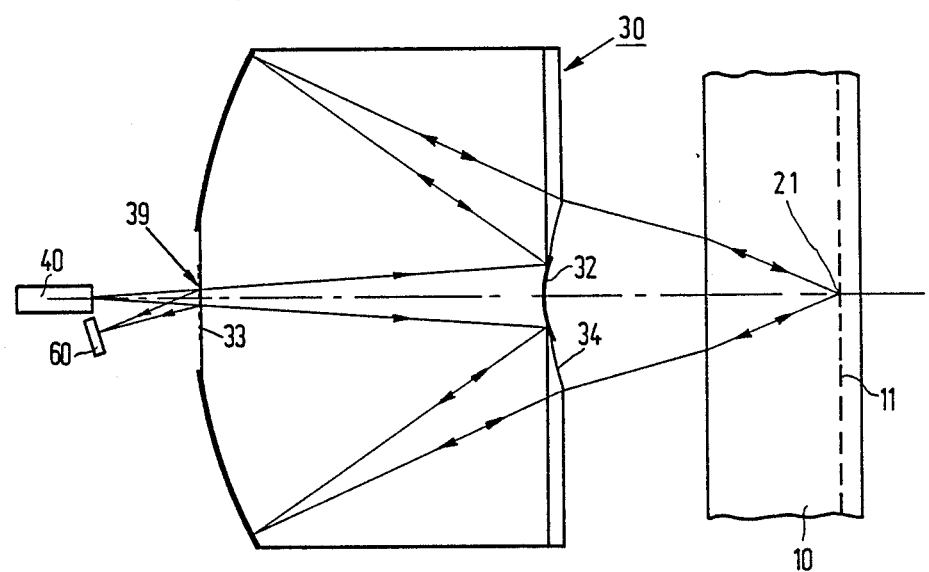

FIGS. 2, 3 and 4 show the optical scanning device according to the invention in which three different embodiments of the mirror objective are shown and with a beam-splitting element in the form of a grating.

In FIG. 2 the transparent body 30 has an aspherical first surface in which the first radiation window 31 is provided which is enclosed by the first reflector 33. The opposite second surface of the transparent body comprises an annular flat portion 34 via which the radiation exits, and a central circular portion 35. This portion 35 is curved and has a reflective grating, preferably a phase grating. The transparent body 30 and the radiation windows and the reflectors are arranged optionally symmetrically around the optical axis. A radiation source 40, for example, a semiconductor laser is connected directly or via an optical fibre to the window 31 on the optical axis.

If the scanning device is intended to read information from an optical record carrier, the reflective grating preferably has such a geometry that the reflected radiation is distributed approximately uniformly in the zero diffraction order and in the first as much as possible. In a scanning device intended for writing information it is, however, preferred that the greater part of the radiation is reflected in the zero order and that the other radiation is reflected as much as possible in the first or one of the higher diffraction orders.

The radiation from the radiation source 40 is directed by the reflector 35 towards the reflector 33 and the part of the radiation which is reflected in the zero order is focussed by the last-mentioned reflector to form the scanning spot 21 in the information plane. The radiation reflected from the information plane is reflected along the reverse path via the reflectors 33 and 35 to the window 31 of the transparent body 30. Due to the geometry of the reflective grating 35 an image point of one order is located next to the position of the radiation source 40. The radiation-sensitive detection system 60 is arranged in this image point.

FIG. 3 shows a preferred embodiment of the scanning device according to the invention. This embodiment is mainly equal to the embodiment of FIG. 2, except that the surface supporting the window 31 and the reflector 33 is spherical and that the transparent body 30 comprises two portions of transparent material 36 and 37 between which a transmission grating 38 is arranged.

The two portions 36 and 37 may directly engage each other in the manner as is shown in the Figure or, contiguous to the transmission grating, a cavity may be left between the portions 36 and 37, which cavity is empty or is filled with a substance having a refractive index which differs considerably from the refractive indices of the materials of the two portions. If the portions 36 and 37 engage each other, the grating 38 should be a black-white grating. In the presence of a cavity it is alternatively possible to arrange a phase grating, which provides the advantage that there are no or hardly any radiation losses in the grating. The transmission grating 38 operates in an identical way as the grating 35 in FIG. 2. The one portion 36 on which the reflector 31 is provided is made of, for example, the glass type BK7 of the Firm of Schott or of quartz, whilst the other portion supporting the reflector 32 is made of SFL6 or LaKN22 likewise of the Firm of Schott.

If the transparent body comprises two portions 36 and 37 which are made from materials having refractive indices between which there is a difference of approximately 0.3, the spherical aberration of the mirror objective will be considerably less as compared with that of a homogeneous transparent body. It has been found that a difference in refractive index between approximately 0.2 and approximately 0.4 suffices for this purpose. Of course it is not necessary for the reduction of spherical aberration to provide a grating on the interface between the portions 36 and 37 of the transparent body. On the other hand, if the grating 38 is provided within the volume of the transparent body it is unnecessary to manufacture the portions 36 and 37 from material shaving different refractive indices. This is, for example, the case if there is no troublesome spherical aberration due to a small numerical aperture of the mirror objective or due to the shape of the reflector 33.

FIG. 3 shows a third embodiment of the optical scanning device according to the invention. In this embodiment the second radiation window 34 and the second reflector 32 are both spherically curved. In the case of a relatively small numerical aperture the radii of curvature of the reflector and the window may be equal and in the case of larger numerical aperture different radii of curvature will often be chosen. Furthermore, the radiation reflected from the information plane 11 in this embodiment is partly coupled out and the coupled-out radiation is directed towards the radiation-sensitive detection system 60 by means of a transmission grating 39 which is arranged on the first radiation window 33 of the transparent body. In this embodiment the radiation source 40 and the radiation-sensitive detection system 60 are arranged at some distance from the radiation window 33.

The grating 39 (or the gratings 35 and 38 in FIGS. 2 and 3, respectively) may be composed of a plurality of sub-gratings, each having different grating parameters, such as grating period and direction and curvature of the grating lines so that the separated beam directed towards the radiation-sensitive detection system is split up in as many beams which can be used for detecting focus errors in accordance with the so-called Foucault method as described, for example in the above-cited Article in "Neues aus der Technik", Volume 1980, No. 6, page 3. If the grating has a constant or linearly varying grating period, the emerging beam may be astigmatic and focus errors may be detected by means of the so-called astigmatic method which is described, for example, in U.S. Pat. No. 4,358,200. The gratings may be conventional gratings or holographic gratings or holograms.

What is claimed is:

1. A scanning device for scanning a reflective information plane in an optical record carrier by means of optical radiation, which scanning device comprises a radiation source for supplying a scanning beam and a mirror objective for focussing such beam into a scanning spot on the information plane, and a radiation-detection system for detecting radiation reflected from the information plane; characterized in that the mirror objective comprises:

a transparent body having a first surface facing the radiation source and a second surface opposite said first surface facing the information plane;

said first surface having a first radiation window centrally positioned around the optical axis of the mirror objective and a first reflector coaxially positioned around said first radiation window, said first reflector being concave reflecting on the inside of said body;

said second surface having a second reflector centrally positioned around the optical axis of the mirror objective and a second window coaxially positioned around said second reflector, said second reflector being convex reflecting on the inside of said body;

the scanning beam from the radiation source entering the mirror objective through said first radiation window, being divergently reflected by said second reflector back to said first reflector, and being convergently reflected by said first reflector through said second radiation window so as to form a scanning spot focussed on said information plane; and a beam-splitting element for spatially separating said scanning beam from radiation reflected back to the mirror objective from said information plane and directing such reflected radiation to said radiation-sensitive detection system.

2. A scanning device as claimed in claim 1, characterized in that the first reflector is curved aspherically.

3. A scanning device as claimed in claim 1, characterized in that the first and second reflectors are curved spherically.

4. A scanning device as claimed in claim 3, characterized in that the second radiation window is also curved spherically.

5. A scanning device as claimed in claim 1, characterized in that the transparent body comprises at least adjoining transparent portions which are manufactured from materials having different refractive indices.

6. A scanning device as claimed in claim 1, characterized in that the beam-splitting element comprises a grating.

7. A scanning device as claimed in claim 6, characterized in that the grating is a transmission grating provided on the first radiation window.

8. A scanning device as claimed in claim 6, characterized in that the grating is a reflection grating provided on the second reflector.

9. A scanning device as claimed in claim 6, characterized in that the transparent body comprises two adjoining transparent portions and in that the grating is a transmission grating provided on one of said portions on a side thereof which adjoins a side of the other portion.

10. A scanning device as claimed in claim 6, 8, 7 or 9, characterized in that the grating has a constant or linearly varying grating period.

11. A scanning device as claimed in claim 6, 8, 7 or 9, characterized in that the grating comprises at least two subgratings having different grating parameters.

12. A scanning device as claimed in any one of claims 1, 2, 3, 4, 5 or 6 which is provided with a radiation sensitive detection system, characterized in that the radiation-sensitive detection system is arranged on the first radiation window in the radiation path of radiation which has been reflected from the information plane and which has traversed the mirror objective.

13. A scanning device as claimed in any one of claims 1, 2, 3, 4, 5 or 6 characterized in that the radiation source is optically connected to the first radiation window.

14. A mirror objective for use in a scanning device for scanning a reflective information plane in an optical record carrier by means of a beam of radiation produced by a radiation source, such mirror objective serving to focus such beam into a scanning spot on the information plane and to direct radiation reflected from the information plane to a radiation-sensitive detection system; said mirror objective comprising:

a transparent body having a first surface facing the radiation source and a second surface opposite said first surface facing the information plane;

said first surface having a first radiation window centrally positioned around the optical axis of the mirror objective and a first reflector coaxially positioned around said first radiation window, said first reflector being concave reflecting on the inside of said body;

said second surface having a second reflector centrally positioned around the optical axis of the mirror objective and a second window coaxially positioned around said second reflector, said second reflector being convex reflecting on the inside of said body;

the scanning beam from the radiation source entering the mirror objective through said first radiation window, being divergently reflected by said second reflector back to said first reflector, and being convergently reflected by said first reflector through said second radiation window so as to form a scanning spot focussed on said information plane; and a beam-splitting element for spatially separating said scanning beam from radiation reflected back to the mirror objective from said information plane and directing such reflected radiation to said radiation-sensitive detection system.

* * * * *